United States Patent [19]

Järvenpää

[11] Patent Number: 4,514,194
[45] Date of Patent: Apr. 30, 1985

[54] APPARATUS AND METHOD FOR REMOVING GASEOUS COMPONENTS AND/OR SOLID IMPURITIES PRESENT IN A GASEOUS FLUID FLOW

[76] Inventor: Viljo J. Järvenpää, Vellamontie 21 as. 6, 04200 Kerava, Finland

[21] Appl. No.: 533,961

[22] Filed: Sep. 20, 1983

Related U.S. Application Data

[63] Continuation-in-part of Ser. No. 409,533, Aug. 19, 1982, Pat. No. 4,478,616.

[51] Int. Cl.³ .................. B01D 47/06; B01D 47/12
[52] U.S. Cl. .......................................... 55/91; 55/92; 55/94; 55/223; 55/238; 55/257 C; 261/79 A
[58] Field of Search .............. 55/89, 90, 92, 94, 223, 55/238, 257 C, 258, 260, 91; 261/79 A, 126

[56] References Cited

U.S. PATENT DOCUMENTS

| | | | |
|---|---|---|---|
| 2,195,707 | 4/1940 | Nutting | 55/223 |
| 2,579,282 | 12/1951 | Vicard | 55/90 |
| 2,604,185 | 7/1952 | Johnstone et al. | 55/89 |
| 3,064,408 | 11/1962 | Erga et al. | 55/90 |
| 3,336,733 | 8/1967 | Wisting | 55/260 |
| 3,616,597 | 11/1971 | Stewart | 55/94 |

FOREIGN PATENT DOCUMENTS 197711  11/1977  U.S.S.R. ........................ 55/257 C

Primary Examiner—David L. Lacey
Attorney, Agent, or Firm—Steinberg & Raskin

[57] ABSTRACT

Apparatus and method for removing gaseous components and/or solid impurities from a gaseous fluid flow by introducing a first scrubbing liquid into contact with the gaseous fluid flow in a pre-purification section to pre-purify the same. The pre-purified gaseous fluid flow is then conducted to the region of the scrubber impeller in the fine-purification section with a second scrubbing liquid being introduced into contact with the pre-purified gaseous flow as the latter is conducted to the region of the scrubber impeller. The flow of the pre-purified gas is accelerated as it is conducted to the region of the scrubber impeller, such as through a conduit which tapers in cross-section in the direction of gaseous fluid flow therethrough. An extremely fine scrubbing of the gaseous fluid is obtained in a reliable manner without the need for large quantities of scrubbing liquid.

14 Claims, 1 Drawing Figure

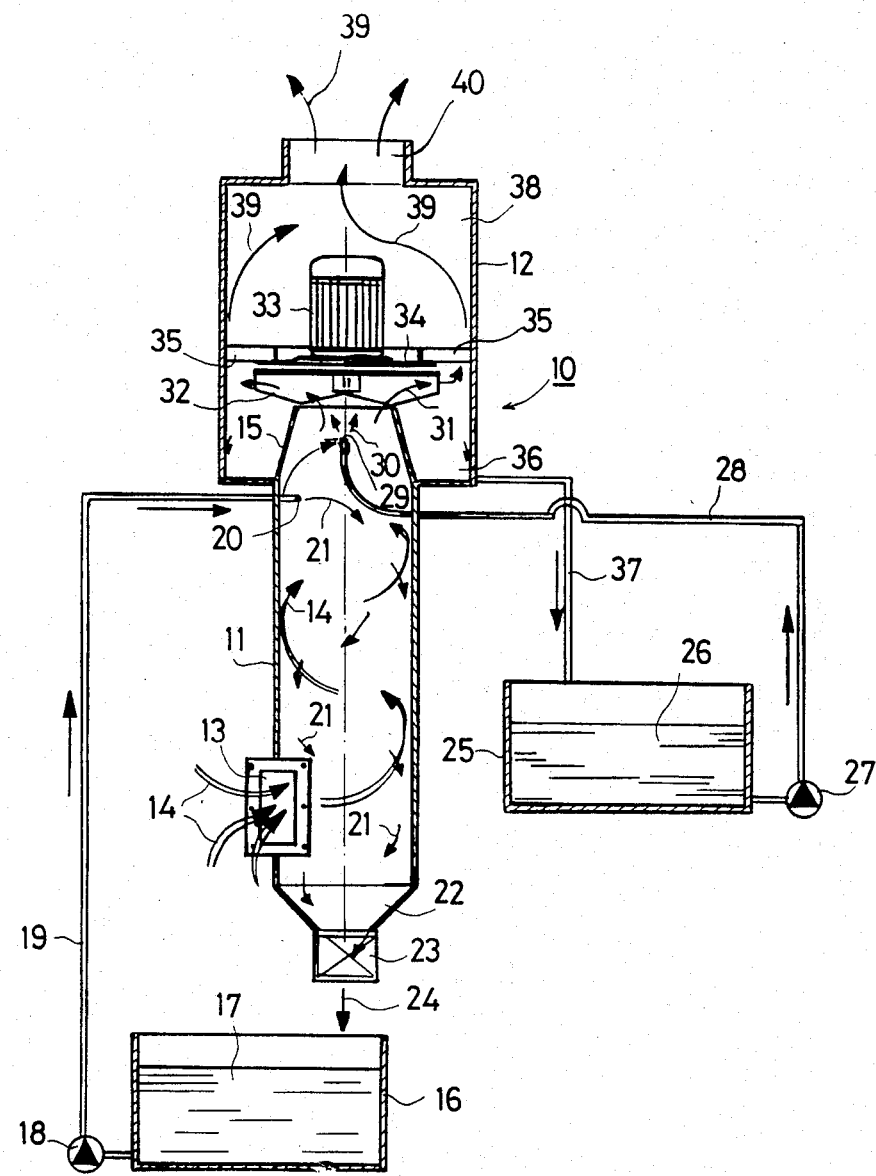

APPARATUS AND METHOD FOR REMOVING GASEOUS COMPONENTS AND/OR SOLID IMPURITIES PRESENT IN A GASEOUS FLUID FLOW

BACKGROUND OF THE INVENTION

This application is a continuation-in-part of application Ser. No. 409,533 filed Aug. 19, 1982, now U.S. Pat. No. 4,478,616.

The present invention relates to apparatus for removing gaseous components and/or solid impurities from a gaseous fluid flow and, more particularly, to apparatus incorporating scrubbing means which serve to wash away any gaseous or solid impurities present in the gaseous fluid flow.

Gaseous fluid flows frequently contain impurities both in the form of gaseous components and solid particles which must be removed prior to further processing and use of the fluid flow.

Various apparatus are known by which gaseous fluid flows, such as coal gas or other gases, are washed or scrubbed to remove such impurities. One type of such apparatus includes a frame structure in which are accommodated an inlet connector through which the gaseous fluid flow is charged into the apparatus, a discharge connector through which the purified fluid flow is discharged from the apparatus, scrubber means for washing the gaseous fluid flow and a connector for conducting a scrubbing liquid into the apparatus so that the same contacts the gaseous fluid flow.

In practice, the gaseous fluid flow frequently contains solid impurities in such large quantities that their separation from the fluid flow before the latter reaches the scrubber means is desirable. Thus, it is common under usual conditions to purify a gaseous fluid flow using a wet scrubber wherein the gaseous fluid flow is conducted into a frame portion of a separator, i.e., into a fluid tank or reaction chamber, wherein intimate contact between the scrubbing liquid and the gaseous fluid flow is attempted to be maximized. At least part of the coarser fraction of the solid matter impurities will separate from the gaseous fluid flow during this scrubbing phase and remain in the separating tank.

However, it is most desirable to separate the greater part of the solid matter impurities from the gaseous fluid flow prior to the scrubbing phase while in a dry state and attempts have been made to achieve this action in either a settling chamber or in a cyclone separator. This technique is advantageous in that the quantity of solid impurities which are carried into the scrubbing liquid is minimized so that the amount of sludge which is created during the scrubbing phase and which must be removed from the apparatus will be maintained at a minimum. Moreover, since a blower is usually provided after the scrubber, this technique also advantageously reduces wear of the blower. A droplet separator generally is provided following the blower and depending upon the particular application may be constituted by a grille, a set of gratings, droplet separators of the cyclone separator type, various rotating and round towers, and the like.

In conventional scrubbers known in the art, the blower is usually similar to a conventional centrifugal blower. A so-called disintegrator type blower is also known in the art into which the gaseous fluid flow with its impurities together with the scrubbing liquid are directed. Such designs require a high power input from a drive and, moreover, the blower is subject to a high rate of wear.

In scrubbers of the Venturi type, the gaseous fluid flow together with the impurities contained therein are accelerated in a Venturi section to obtain a high velocity and at the same time the scrubbing liquid is introduced into the accelerated fluid flow. After passing through the Venturi section, the gaseous fluid flow with a reduced flow velocity is acted upon by a droplet separator where the impurities will serve as crystallization nuclei.

So-called S-wave scrubbers have also been utilized in connection with the purification of gaseous fluid flows. In such arrangements, the gaseous fluid flow together with a scrubbing liquid flows through an S-wave shaped slit to enter into a free space from where it is directed into a blower. In such arrangements, there is no separate droplet separator, the separation of droplets taking place in the free space after the S-wave scrubber and before the blower. However, a risk exists in this arrangement that supercondensing moisture may be entrained with the gaseous fluid flow with droplets then being flung outwardly into the surrounding areas.

Reference is made to my copending application Ser. No. 409,533 filed Aug. 19, 1982, in which a wet scrubber is disclosed in which the end section of a tubular fluid flow inlet connector which is adjacent to the scrubber means has a conical tapered configuration to accelerate the fluid flow through the inlet connector before the fluid flow is carried to the scrubber means. In this apparatus, the tubuler inlet connector is provided with openings or holes which receive the return flow of the scrubbing liquid into the inlet connector, the openings being situated in the region of the inlet connector where the fluid flow is not accelerated. The return flow of the scrubbing liquid within the tubular inlet connector produces a pre-purification of the fluid flow.

The scrubber arrangement described above is not efficient under all circumstances. In particular, if the fluid flow being purified contains large quantities of impurities or if the gaseous fluid flow being purified is very hot, the arrangement disclosed in application Ser. No. 409,533 is not satisfactory. Moreover, this arrangement has a drawback in that it is necessary to use large quantities of scrubbing liquid and, as a result, the circulation of the scrubbing liquid becomes difficult. The quantity of scrubbing liquid may become so heavily contaminated that its circulation is impeded. These difficulties may ultimately result in the gaseous fluid flow not being purified to the indicated requirements due to the large concentration of the impurities in the scrubbing liquid.

Moreover, the arrangement disclosed in the above-identified application cannot be reliably used when it is desired to accelerate the fluid flow being scrubbed to a very high velocity since such operation would risk that impurities present in the circulating scrubbing liquids as it passes through the apertures in the tubular inlet connector will be entrained in the pure fluid flow.

SUMMARY OF THE INVENTION

Accordingly, it is an object of the present invention to provide a new and improved apparatus for removing gaseous components and/or solid impurities from a gaseous fluid flow.

Another object of the present invention is to provide a new and improved scrubber apparatus which overcomes the drawbacks of the various known scrubber arrangements.

Still another object of the present invention is to provide a new and improved scrubber apparatus which does not require large quantities of scrubbing liquid to attain reliable results.

A further object of the present invention is to provide a new and improved scrubber apparatus which is well suited for treating gaseous fluid flows which contain large amounts of impurities and for very hot gaseous fluid flows.

Briefly, in accordance with the present invention these and other objects are attained by providing scrubber apparatus including a pre-purification section and a fine-purification section in fluid communication therewith and in which a scrubber device is situated. A first scrubbing liquid is introduced into contact with the gaseous fluid flow in the pre-purification section to pre-purify the same. The pre-purified gaseous fluid flow is conducted to the region of the scrubber device and is accelerated as it is conducted. As the pre-purified gaseous fluid flow is conducted to the region of the scrubber device, a second scrubbing liquid is introduced into contact therewith.

Numerous advantages are obtained by the present invention. Only minimal quantities of scrubbing liquid are required yet a high scrubbing efficiency is attained, even where high energy scrubbers are not used.

According to the invention, two separate liquid scrubbing systems are employed. The first scrubbing fluid introduced into contact with the gaseous fluid flow in the pre-purifying section is circulated in its own liquid circulation system and may obtain a concentration of gaseous components and/or solid impurities to a desired concentration. Since the gaseous fluid flow will be rendered exceedingly clean or pure after the pre-purification step, the second scrubbing liquid which is introduced into contact with the pre-purified gaseous flow will remain relatively pure, i.e., the concentration of impurities in the second scrubbing liquid will be relatively low, even after relatively long periods and where the second scrubbing liquid is circulated in its own circulation system. Moreover, the present invention insures that the impurities present in the first scrubbing liquid will not under any circumstances become entrained in the gaseous fluid flow which has already been purified.

DETAILED DESCRIPTION OF THE DRAWINGS

A more complete understanding of the present invention and many of the attendant advantages thereof will be readily appreciated when the same becomes better understood by reference to the following detailed description when considered in connection with the accompanying drawings in which the sole FIGURE is a schematic side elevation view in section of an apparatus in accordance with the invention for practicing the method of the invention.

DESCRIPTION OF THE PREFERRED EMBODIMENTS

Referring now to the drawing, an apparatus for removing gaseous components and/or solid impurities from a gaseous fluid flow in accordance with the invention is generally designated 10. The apparatus 10 includes a pre-purification section 11 and a fine-purification section 12 in fluid communication therewith. In the illustrated embodiment, the pre-purification section 11 comprises a tubular chamber provided with an inlet flow aperture 13 through which the gaseous fluid flow 14 to be treated enters into the interior of the chamber. The gaseous fluid flow 14 is drawn through the inlet aperture 13 into the tubular chamber of the pre-purification section 11 tangentially so that the incoming gaseous fluid flow 14 flows upwardly with a rotary motion within the tubular chamber.

The upper part 15 of the tubular chamber of the pre-purification section 11 has a conical configuration tapering upwardly in the direction of the fine-purification section 12 so that the gaseous fluid flow passing through the upper part 15 will be accelerated as it flows therethrough. Thus, the upper part 15 of the tubular chamber of the pre-purification section 11 includes in the illustrated embodiment an outlet through which the gaseous fluid flow, pre-purified in section 11 as discussed below, is discharged from the pre-purification chamber, as well as means for accelerating the pre-purified gaseous fluid flow.

A tank 16 is provided with a first scrubbing liquid 17. A pump 18 is provided to pump the first scrubbing liquid 17 from the tank 16 through a tubular connector or conduit 19, the end of which extends through the wall defining the chamber of the pre-purification section 11 and terminates at a discharge aperture 20, such as a nozzle or the like. The discharge aperture 20 of the tubular connector 19 directs the first scrubbing liquid 17 against the wall of the tubular chamber of pre-purification section 11 so that the first scrubbing liquid 17 flows in a rotary motion downwardly in the tubular chamber of section 11. Since the incoming gaseous fluid flow 14 and the flow of the first scrubbing liquid 17, designated 21, both have a rotary motion but in opposite directions, the first scrubbing liquid 17 will efficiently flush the incoming gaseous fluid flow 14 to remove at least the largest and heaviest solid impurities therefrom. The first scrubbing liquid 17 and solid impurities entrained therein run down into the bottom region 22 of the tubular chamber of section 11 to be conducted back into the tank 16 as a flow 24 through a valve means 23.

According to an important feature of the invention, a second scrubbing liquid is introduced into contact with the gaseous fluid flow which has been pre-purified in the section 11 as described above as the pre-purified gaseous fluid flow is accelerated, i.e., as the pre-purified gaseous fluid flow passes through the tapered upper part 15 of the chamber of the pre-purification section 11. In the illustrated embodiment, a second tubular connector or conduit 28 communicates with a tank 25 containing a second scrubbing liquid 26 and extends through the chamber of the pre-purification section 11 and terminates at a discharge aperture 29, such as a nozzle. The discharge aperture 29 of the connector 28 is situated in the upper part 15 of the pre-purification chamber, i.e., in the region where the pre-purified gaseous fluid flow is accelerated. The pump 27 pumps the second scrubbing liquid 26 from the tank 25 through the connector 28 so that the second scrubbing liquid discharges from the nozzle or discharge aperture 29 as a flow, designated 30. The second scrubbing liquid 26 may be relatively pure and different composition from the first scrubbing liquid 17, although it is understood that the same composition can be used for both the first and second scrubbing liquids.

Scrubber means, generally designated 32, are situated in the fine-purification section 12. The scrubber means 32 comprise a rotatable blade impeller which is driven by an electric motor 33 which is supported by a plate 34 and struts 35.

The upper part 15 of the chamber of the pre-purification section 11 in which the pre-purified gaseous fluid flow is accelerated has its discharge opening situated in the region of and substantially adjacent to the scrubber means 32 as seen in the FIGURE. The flow 30 of the second scrubbing liquid discharged from the aperture or nozzle 29 is admixed into the already pre-purified gaseous fluid flow 14 to form a total flow, designated 31, comprising a combination of the already pre-purified gaseous fluid flow 14 and the flow 30 of the second scrubbing liquid 26. This total flow 31, already accelerated as it passes through the upper part 15, is further accelerated to gain additional velocity by means of the rotation of the impeller of the scrubber means 32.

After passing through the impeller of the scrubber means 32, the total fluid flow 31 is purified in that the liquid droplets of the second scrubbing liquid 26 are flung against the walls of the lower part 36 of the fine-purification section 12 from where they run through the tubular connector or conduit 37 back into the tank 25. In this manner, the gaseous fluid flow is finely purified in the fine-purification section 12. The pure gaseous fluid flow, designated 39, is directed to the top part 38 of the fine-purification section 12 and is discharged therefrom through a discharge aperture 40.

It will be seen that the objects of the invention as set forth above are attained in the manner described above. The first scrubbing liquid 17 may become concentrated to a desired concentration or indeed may become highly supersaturated. The second scrubbing liquid 26 may be an alkali, even where the first scrubbing liquid 17 is acidic. This affords the remarkable advantage that the gaseous fluid flow 14 being purified in the apparatus 10 of the invention may also be neutralized during the scrubbing operations. The amount of the second scrubbing liquid 26 with which the gaseous fluid flow is treated may be considerably less per unit time than that of the first scrubbing liquid 17 while still achieving excellent purification of the gaseous fluid flow.

Lower power motors 33 can be used since the second scrubbing liquid 26 which passes through the impeller of the scrubber means 32 requires little additional acceleration. The nozzle 20 of the conduit 19 for the first scrubbing liquid 17, as well as the nozzle 29 of the conduit 28 for the second scrubbing liquid 26 may be controlled in various ways so that desired spray effects are obtained on the walls of the apparatus.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Apparatus for removing gaseous components and/or solid impurities from a gaseous fluid flow, comprising:

a pre-purification section for the pre-purification of the gaseous fluid flow including a pre-purification chamber, inlet means through which the gaseous fluid flow is introduced into said pre-purification chamber, outlet means through which the pre-purified gaseous fluid flow is discharged from said pre-purification chamber, and first scrubbing liquid means for conducting a first scrubbing liquid into contact with the gaseous fluid flow to pre-purify the latter;

a fine-purification section for the fine-purification of the pre-purified gaseous fluid flow discharged from said pre-purification section, said fine-purification section including a fine-purification chamber, scrubber means disposed in said fine-purification chamber, and outlet means through which the fine-purified gaseous fluid flow is discharged from said fine-purification chamber;

flow passage and accelerating means for conducting the pre-purified gaseous fluid flow from said pre-purification section directly to said scrubber means of said fine-purification section and for accelerating the pre-purified gaseous fluid flow prior to the latter reaching said scrubber means of said fine-purification section;

means for conducting a second scrubbing liquid into contact with the pre-purified gaseous fluid flow as the latter is accelerated in its conduction to the scrubber means of said fine-purification section; and said scrubber means include impeller means for accelerating a total fluid flow comprising the second scrubbing liquid flow from said second scrubbing liquid conducting means and the pre-purified gaseous fluid flow to higher velocities and for separating droplets of the second scrubbing liquid from the total fluid flow.

2. The apparatus of claim 1 wherein said flow passage and accelerating means include said outlet means of said pre-purification section through which the pre-purified gaseous fluid flow is discharged from said pre-purification chamber.

3. The apparatus of claim 1 wherein said flow passage and accelerating means comprise a fluid passage which tapers in cross-sectional area in the downstream direction of fluid flow therethrough and towards said scrubber means.

4. The apparatus of claim 3 wherein said scrubber means includes a rotatable blade impeller and wherein said tapered flow passage terminates adjacent to said blade impeller.

5. The apparatus of claim 3 wherein a downstream end of said tapered fluid passage in the direction of fluid flow therethrough is situated substantially adjacent to said scrubber means.

6. The apparatus of claim 1 wherein said second scrubbing liquid conducting means includes a fluid conduit having flow directing aperture means and wherein said flow directing aperture means directs the second scrubbing liquid in a direction towards said scrubber means.

7. The apparatus of claim 6 wherein said pre-purification chamber is defined by wall means and wherein said fluid conduit of said second scrubbing liquid conducting means passes through said wall means of said pre-purification chamber.

8. The apparatus of claim 1 further including means for recirculating the second scrubbing liquid including a tank adapted to contain the second scrubbing liquid and a return conduit means for directing the second scrubbing liquid from said fine-purification chamber to said tank, and wherein the total flow is purified by separating the liquid droplets of the second scrubber liquid which are flung against the walls defining said fine-purification chamber to collect at the bottom of said fine-purification chamber and then to return to said tank through said return conduit means.

9. Apparatus for removing gaseous components and/or solid impurities from a gaseous fluid flow, comprising:
- a pre-purification section having a gaseous fluid outlet;
- means for introducing the gaseous fluid flow into said pre-purification section;
- a fine-purification section in fluid communication with said outlet of said pre-purification section, a rotatable scrubber impeller being situated in said fine-purification section;
- first means for introducing a first scrubbing liquid into contact with the gaseous fluid flow in said pre-purification section to pre-purify the same;
- flow passage and accelerating means for conducting the pre-purified gaseous fluid flow to the region of said scrubber impeller and for accelerating the pre-purified gaseous fluid flow as it is conducted directly to the region of said scrubber impeller through said flow passage and accelerating means; and
- second means for introducing a second scrubbing liquid into contact with the pre-purified gaseous fluid flow as the latter is conducted to the region of said scrubber impeller.

10. A method for removing gaseous components and/or solid impurities from a gaseous fluid flow, comprising the steps of:
- introducing the gaseous fluid flow into a pre-purification chamber;
- pre-purifying the gaseous fluid flow in said pre-purification chamber by conducting a first scrubbing liquid into contact with the gaseous fluid flow in said pre-purification chamber;
- conducting the pre-purified gaseous fluid flow to the region of a scrubber impeller situated in a fine-purification chamber while accelerating the pre-purified gaseous fluid flow; and
- conducting a second scrubbing liquid into the flow of the pre-purified gaseous fluid flow as the latter is being accelerated directly prior to its reaching the scrubber impeller.

11. The method of claim 10 wherein said first and second scrubbing liquids are different liquids.

12. The method of claim 11 wherein the first scrubbing liquid is acidic and the second scrubbing liquid is alkali.

13. The method of claim 11 wherein the first scrubbing liquid is alkali and the second scrubbing liquid is acidic.

14. The method of claim 10 wherein the quantity of second scrubbing liquid conducted is less than the quantity of first scrubbing liquid conducted per unit time.

* * * * *